US005271789A

United States Patent [19]

Takagi et al.

[11] Patent Number: 5,271,789

[45] Date of Patent: Dec. 21, 1993

[54] TAPE END PROCESSING UNIT

[75] Inventors: Yukihito Takagi; Shigeru Nakata; Teruo Imamaki; Mikio Sakuma, all of Nagoya, Japan

[73] Assignee: Brother Kogyo Kabushiki Kaisha, Aichi, Japan

[21] Appl. No.: 757,840

[22] Filed: Sep. 11, 1991

[30] Foreign Application Priority Data

Sep. 12, 1990 [JP] Japan .................................... 2-95998

Oct. 3, 1990 [JP] Japan .................................... 2-265446

[51] Int. Cl.[5] ........................ B32B 31/00; B41J 13/00; B26D 3/08

[52] U.S. Cl. .................................... 156/387; 156/443; 156/511; 400/621; 83/861; 83/881

[58] Field of Search ............... 156/443, 510, 511, 387, 156/267, 268; 83/861, 879, 881, 176, 880; 400/621

[56] References Cited

U.S. PATENT DOCUMENTS 3,310,145 2/1964 Pedersen ........................ 400/621 X 3,359,773 12/1967 Stuchbery ........................ 83/879 X 3,366,212 1/1968 McInnis ........................ 400/621 X 3,414,102 12/1968 Norvelle ........................ 400/621 X 3,757,919 9/1973 Pedersen ........................ 400/621 X 4,927,278 5/1990 Kuzuya et al. ................. 156/387 X 5,066,152 11/1991 Kuzuya et al. .................. 83/861 X

OTHER PUBLICATIONS

EPC Publication No. 0319209 corresponding (Jul. 6, 1989) United States Pat. No. 5,066,152 (Kuzuya et al. Nov. 19, 1991).

*Primary Examiner*—David A. Simmons

*Assistant Examiner*—Chester T. Barry

*Attorney, Agent, or Firm*—Kane, Dalsimer, Sullivan, Kurucz, Levy, Eisele and Richard

[57] ABSTRACT

A tape end processing unit has a guide path for guiding a tape piece from an insertion port into which the tape piece is inserted to a cutting blade to cut off the tape piece. The guide path is bent in a convex form in a direction in which the cutting blade moves when the tape piece is cut. With this configuration, the curl of the tape piece can be cured, and an end of the tape piece can be cut off with an accurate length. The tape end processing unit may have a blade receiving stand which has a concave section having a width narrower than the length of the cutting blade and a depth smaller than the thickness of a releasable paper constituting a part of the tape piece. With this configuration, the tape end processing unit can cut off an end of the tape piece in a state where the releasable paper can easily be separated.

19 Claims, 7 Drawing Sheets

TAPE END PROCESSING UNIT

BACKGROUND OF THE INVENTION

This invention relates to a tape end processing unit for cutting or processing an end of a tape with a cutting blade.

There are many devices used to print marks, letters and others on a tape, in one of which the marks and letters are selected by turning a circular die provided with the marks and letters, and the selected letters and others are printed on a tape. Then the tape is cut by a cutting blade to a specified length and took out from the device. This type of device is disclosed in U.S. Pat. No. 3,310,145.

In this type of device, however, there is a gap between a position where the letters and others are printed and a position where the tape is cut by the cutting blade to form a tape piece having printed letters thereon, so that an unnecessary and odd blank section is generated at each end of the tape piece.

Therefore, a tape end processing unit is necessary to cut off the odd section of the tape piece as described above, and when the tape piece is cut, it is necessary to cut off the blank sections accurately in terms of their length and cutting positions.

If a tape, which is stored in a tape forming device is wound around a roll-formed spool, and once a curl of the tape piece is generated, it is very difficult to accurately cut the curled tape piece at their ends.

Also, there is well known a printing device, in which letters, signs and others are printed on a tape comprising a releasable paper and a base tape which are laminated with an adhesive layer placed therebetween, and the tape is cut to a specified length to form a tape piece. A tape piece prepared by this type of printer is adhered on a file or others for use as an index to show the contents of the file after the releasable paper is separated from the base tape.

When the releasable paper is separated from the base tape, a user bends a corner of the tape piece to generate a small clearance between the adhesive layer and the releasable paper, and inserts a thin material such as a user's claw into the clearance to separate the releasable paper from the base tape.

When the releasable paper is separated from the base tape in a manner as described above, a fold is generated on the base tape, and sometimes it becomes difficult to adhere the base tape on something because of the fold, or the adhered tape piece is easily separated therefrom. It is known that this problem can be solved by making a machined line at an end of the tape piece with a specific cutting unit with the base tape and releasable paper kept in a laminated state.

Even in this case, however, when separating the releasable paper from the base tape, it is difficult for a user to accurately cut the base tape along the machined line, and sometimes the machined line itself makes an adhered tape piece more easily separable. Furthermore, when the machined line is formed on the tape, cracks sometimes occur at places other than the machined line on the tape due to quality of material of the base tape or a thickness thereof, and the tape itself becomes unavailable.

SUMMARY OF THE INVENTION

An object of this invention is to provide a tape end processing unit which can accurately cut off an end of a curled tape piece prepared by a tape forming device.

Another object of this invention is to provide a tape end processing unit which can accurately cut off an end of a curled tape piece prepared by a tape forming device and make it easy to separate a releasable paper from a base tape with its simple configuration.

According to one aspect of this invention, there is provided a tape end processing unit for cutting an end of a tape piece on which letters or marks are printed, which comprises: an insertion port into which the tape piece is inserted; a cutting blade for cutting off the end of the tape piece; an operational means for operating the cutting blade; and a guide path for guiding insertion of the tape piece from the insertion port to the cutting blade, the guide path being curved in a convex form towards a direction in which the cutting blade moves when the tape piece is cut.

According to another aspect of this invention, there is provided a tape end processing unit for cutting an end of a tape piece prepared by a tape preparing means for printing letters or marks on a continuous tape which comprises a releasable paper and a base tape laminated with an adhesive layer placed therebetween and which is cut at a predetermined length, which comprises: an insertion port into which the tape piece is inserted; a cutting blade for cutting off the end of the tape piece; an operational means for operating the cutting blade; a guide path for guiding insertion of the tape piece from an insertion port to a position for cutting the tape piece by the cutting blade; and a blade receiving stand facing the cutting blade for receiving the cutting blade when the tape piece is cut, the blade receiving stand being provided with a concave section which has a width narrower than a length of the cutting blade and a depth smaller than a thickness of the releasable paper and is arranged on a face, opposed to the cutting blade, of the blade receiving stand.

According to still another aspect of this invention, there is provided a tape end processing unit for cutting an end of a tape piece prepared by a tape preparing means for printing letters or marks on a continuous tape which comprises a releasable paper and a base tape laminated with an adhesive layer placed therebetween and which is cut at a predetermined length, which comprises: an insertion port into which the tape piece is inserted; a cutting blade for cutting off the end of the tape piece; a blade receiving stand disposed a distance away from the cutting blade for receiving the cutting blade when the tape piece is cut; an operational means for moving the cutting blade toward the blade receiving stand to cut off an end of the tape piece inserted between the cutting blade and the blade receiving stand in a state wherein the base tape faces the cutting blade; and a guide path for guiding insertion of the tape piece from the insertion port to the cutting blade, the guide path being curved in a convex form toward a direction in which the cutting blade moves when the tape piece is cut, the blade receiving stand being provided with a concave section which has a width narrower than a length of the cutting blade and a depth smaller than a thickness of the releasable paper and is arranged on a face, opposed to the cutting blade, of the blade receiving stand.

The tape end processing unit according to this invention has an insertion port to which a tape piece is inserted, a cutting blade to cut off an end of the tape piece and a guide path to guide insertion of the tape piece from the insertion port to a position for cutting the tape piece by the cutting blade, and the guide path is curved or bent in a convex form in the direction in which the cutting blade moves when the tape piece is cut. For this reason, the curled tape piece is cut accurately, a curl thereof being cured simultaneously.

Also, in the tape end processing unit according to this invention, on the surface of the blade receiving stand facing the cutting blade is arranged a concave section having a width narrower than the length of the cutting blade and a depth smaller than the thickness of the releasable paper, so that movement of the cutting blade is restricted by the formation of the concave section. For this reason, the base tape and the adhesive layer constituting a part of the tape piece are cut off by the cutting blade, but the releasable paper is not cut off. As a result, an easy separation of the releasable paper can be performed.

Additionally, the tape end processing unit according to this invention has an insertion port into which a tape piece is inserted, a cutting blade arranged along the width direction of the tape piece which cuts off an end of the tape piece, a blade receiving stand facing the cutting blade and arranged at a distance therefrom, a guide path to guide insertion of the tape piece from the insertion port to a position for cutting the tape piece by the cutting blade, and an operational member which moves the cutting blade to the blade receiving stand and cuts off an end of the tape piece inserted between the cutting blade and the blade receiving stand in a state wherein the base tape faces the cutting blade. The guide path is bent or curved in a convex form in the direction in which the cutting blade moves when the tape piece is cut. On a surface, of the blade receiving stand, facing the cutting blade is arranged a concave section having a width narrower than the length of the cutting blade and a depth smaller than the thickness of the releasable paper. For these reasons, the curled tape piece is accurately cut off. In addition, the cutting blade is restricted by the formation of the concave section, so that the base tape and the adhesive layer constituting a part of the tape piece are cut, but the releasable paper is not cut off. As a result, an easy separation of the releasable paper from the base tape is performed reliably.

Further objects, features and other aspects of this invention will be understood from the following detailed description of the preferred embodiments of this invention with reference to the drawings.

BRIEF DESCRIPTION OF THE PREFERRED EMBODIMENTS

Description is made for embodiments of this invention with reference to the drawings.

Figure 1:
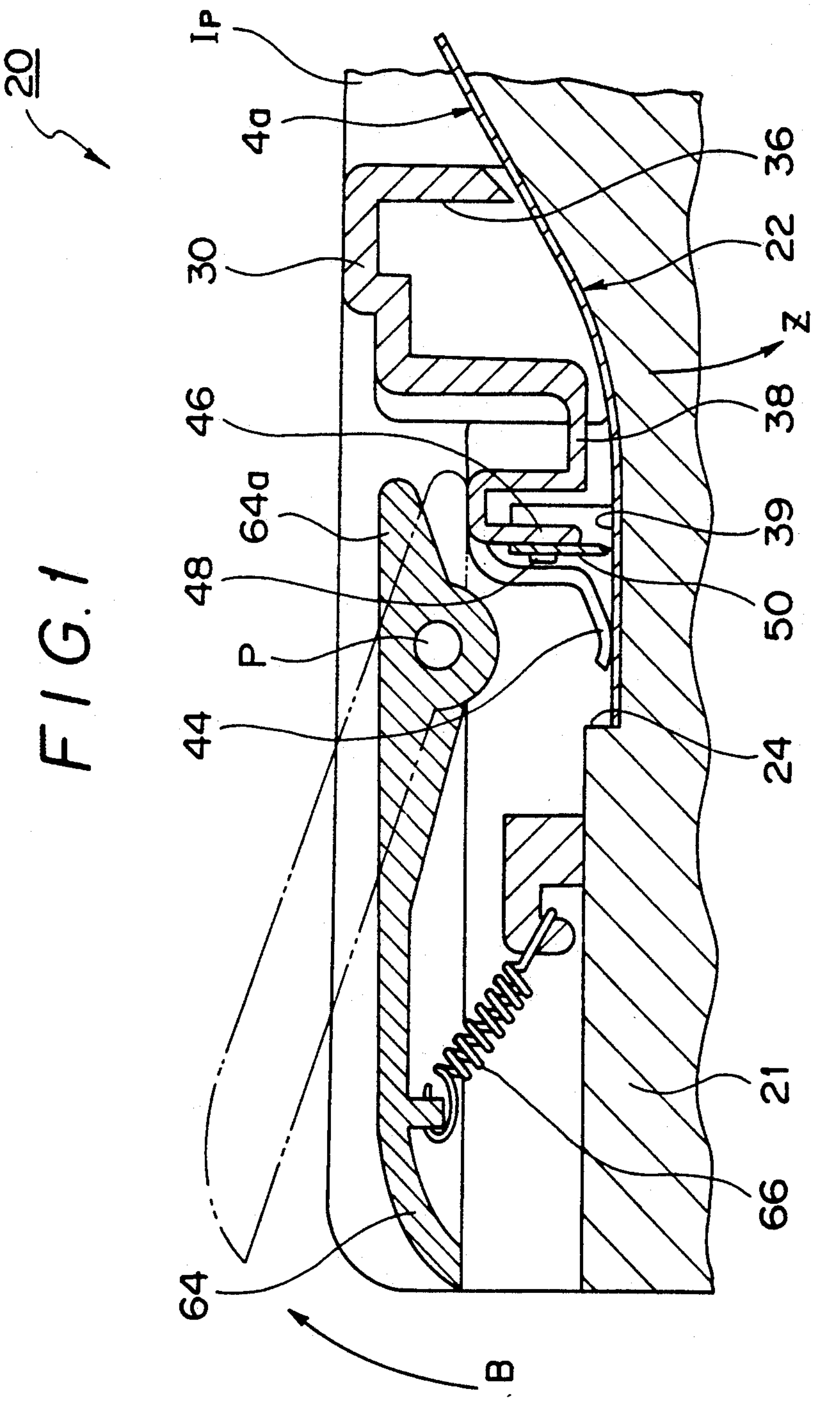
FIG. 1 is an illustration showing a tape end processing unit according to this invention.

FIG. 1 shows an embodiment of a tape end processing unit 20 according to this invention. The tape end processing unit 20 has an insertion port Ip into which a tape piece 4*a* is inserted, a cutting blade 50 to cut off an end of the tape piece 4*a*, and a guide path 22 to guide insertion of the tape piece 4*a* from the insertion port Ip to a position for cutting the tape piece 4*a* by the cutting blade 50. The guide path 22 is bended or curved in a convex form toward the direction in which the cutting blade moves when the tape piece 4*a* is cut. Namely, the guide path 22 has a surface curved in a direction which is reverse to a direction of a curl of the tape piece 4*a*.

Figure 2:
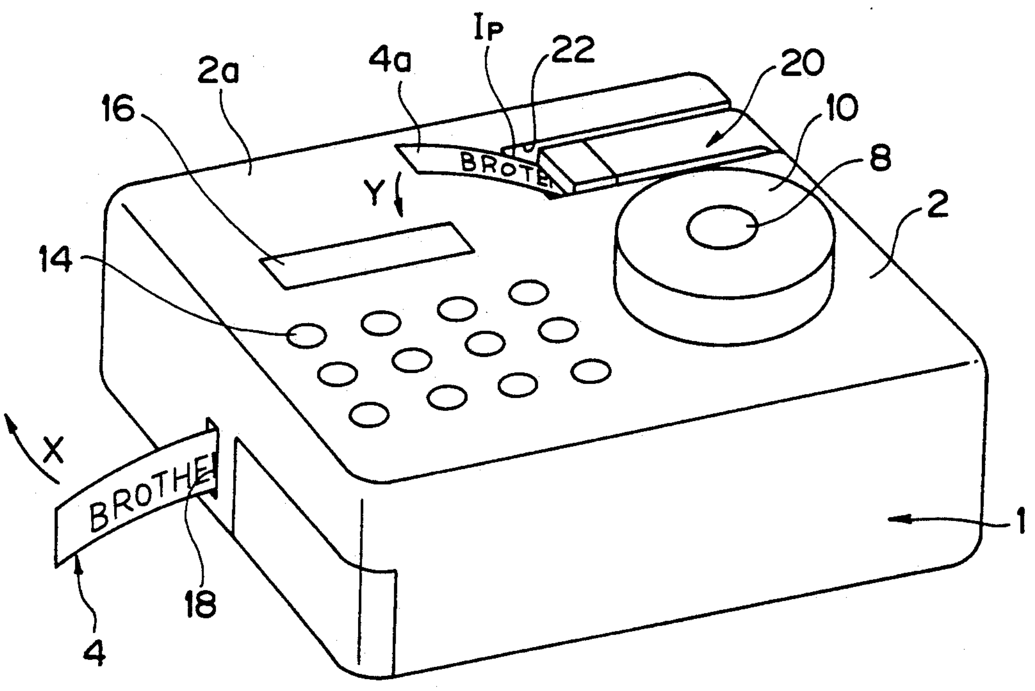
FIG. 2 is a perspective view showing an embodiment of a tape forming device having therein the tape end processing unit according to this invention.

FIG. 2 is a perspective view of a tape forming device having integrally the tape end processing unit 20 therein according to this embodiment.

Figure 3:
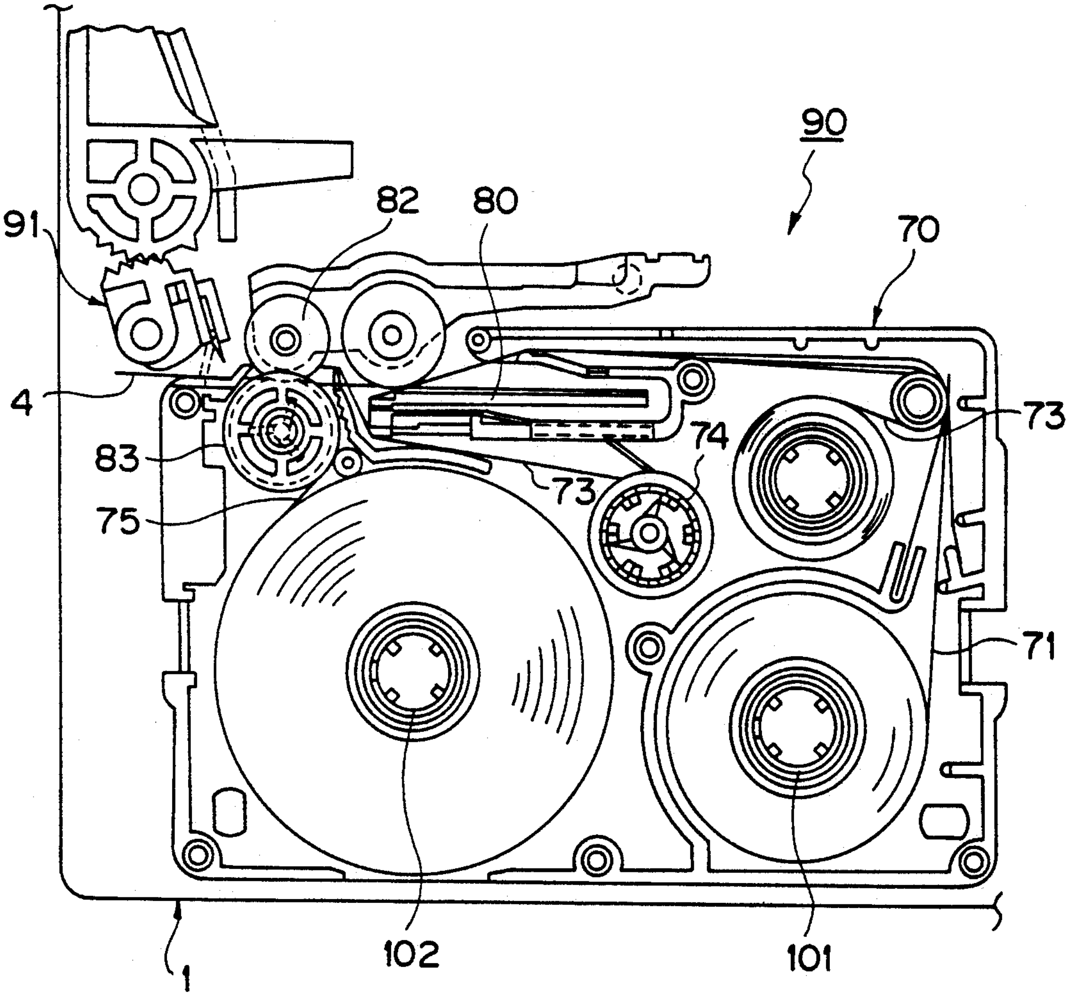
FIG. 3 is an illustration showing a tape preparing unit accommodated in the tape forming device shown in FIG. 2.

As shown in FIG. 2, the tape end processing unit 20 according to this embodiment is arranged integrally on a top surface 2*a* of a housing 2 of a tape forming device 1 so that the tape end processing unit can easily process an end of the tape piece 4*a* on which printing is made by the tape preparing unit 90 (FIG. 3).

On the top surface 2*a* of the housing 2 is arranged a rotatable letter-selection dial 8 which has letters, signs, codes and others on its circular dial face 10. A group of functional keys 14 providing various types of control on the tape forming device 1 are arranged adjacently to the letter-selection dial 8, and letters selected by the dial 8 to be printed on a continuous tape 4 are displayed on a liquid crystal display 16. The tape 4 is fed outside from the housing 2 through a tape discharge port 18. The fed out tape 4 is cut off by a cutter of the tape preparing unit 90 as shown in FIG. 3, thus the tape piece 4*a* being prepared.

Figure 4:
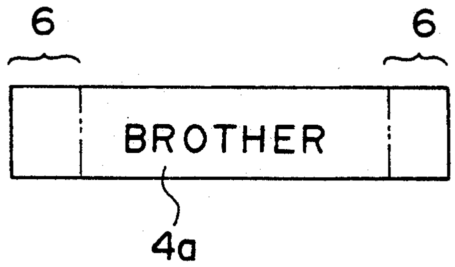
FIG. 4 is an illustration showing a tape piece which is prepared by the tape preparing unit shown in FIG. 3 to be processed by the tape end processing unit according to this invention.

The tape preparing unit 90 has a tape cartridge 70. Inside the cartridge 70, a transparent film 71 forming a base tape, an ink ribbon 73, and a double-face adhesive tape 75 with a releasable paper on one side thereof are stored. The transparent film 71 is stored on a reel 101 in a wound state and the adhesive tape 75 is stored on a reel 102. A mirror image of letters is printed by a print head 80 on the transparent film 71 via the ink ribbon 73. Then, the ink ribbon 73 is wound up by a rolling spool 74, while the transparent film 71 is transferred to the tape discharge port 18 (FIG. 2) by a pair of feed rollers 82 and 83 as a guide means, and, in this process, the transparent film 71 is adhered to one side of the double-face adhesive tape 75, on which the releasable paper is not arranged. After a string of letters or characters are printed on the transparent film 71, the tape is cut off by a cutting mechanism 91 to form a tape piece 4a. However, as there is a physical distance between the print head 80 and the cutter mechanism 91, the tape piece 4a has two blank sections 6 and 6 as shown in FIG. 4 before and behind a string of letters. As shown in FIG. 3, the tape 4 comprises the transparent tape 71 and the double-face adhesive tape 75 with the releasable paper as shown in FIG. 3, and the double-face adhesive tape 75 is adhered onto the side of the transparent tape 71 where printing is performed. The user visually recognizes a string of characters from the side of the transparent tape 71. Then, because the transparent tape 71 has transparency, and also because the printed letters are in a mirror image, the user can visually recognize the characters as a normal image. One of examples of the tape 4 will be explained later with reference to FIG. 7. The tape preparing unit 90 is well known as disclosed in U.S. Pat. No. 4,927,278, and, therefore, detailed description is eliminated.

The path for the double-face adhesive tape 75 with the releasable paper is largely curved by a feed roller 83, which causes a curl on the tape 4. The curl has a radius of curvature on the opposite side to the front surface of the tape 4 which is visually recognized, and the tape piece 4a is curled in the direction indicated by an arrow X or Y in FIG. 2, or in the direction indicated by an arrow Z in FIG. 1.

The curled tape piece 4a printed and cut off as described above is processed by the tape end processing unit 20. As shown in FIGS. 1 and 2, a portion of the housing 2 also serves as a basic section 21 of the tape end processing unit 20. The top surface 2a has the concave guide path 22 having a certain depth and a width corresponding to the width of the tape piece 4a, into which the tape piece 4a can be inserted with the front surface of the tape piece 4a directed upward. And, as shown in FIG. 1, in the guide path 22 is arranged a stop face 24 to restrict further insertion of the tape piece 4a because a tip of the tape piece 4a hits the face when inserted thereinto.

Figure 5:
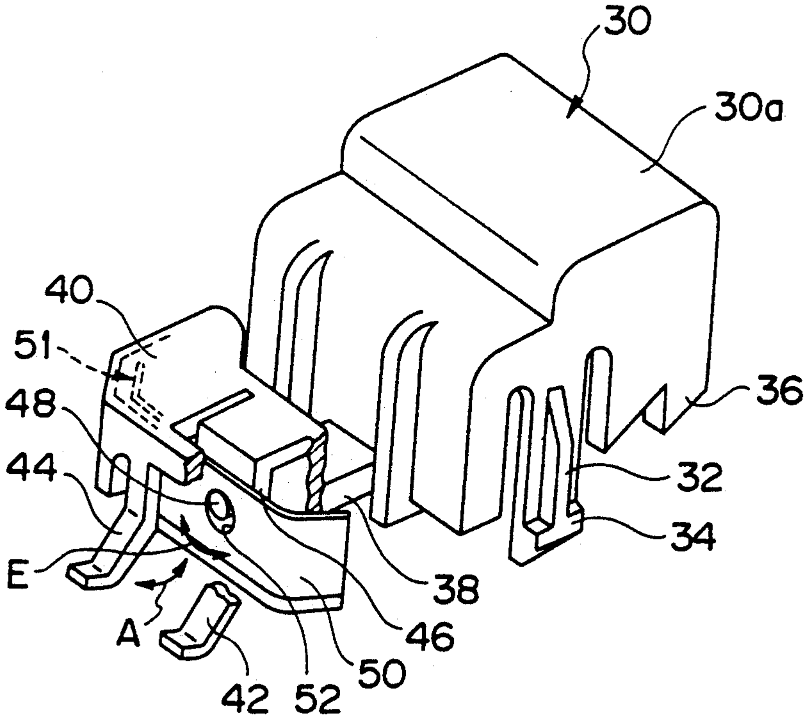
FIG. 5 is an illustration showing a cutter holder disposed in the tape end processing unit according to this invention.

Also, inside the guide path 22 is arranged a cutter holder 30 made of such material as polyacetal or nylon and striding over the tape piece 4a when inserted thereinto. As shown in FIG. 5, this cutter holder 30 has a main body 30a and two hooking sections 32 in both sides thereof (only one of them is shown), and two claws 34 (only one of them is shown) are arranged at the tips of the hooking sections. The claws 34 are hooked to the basic section 21 to mount the cutter holder 30 on the basic section 21 in a quickly disconnectable manner.

Additionally, in the cutter holder 30 is arranged a tape guide section 36 to guide the tape piece 4a for correct insertion by preventing the tape piece 4a from being raised when inserted into the guide path 22.

Also, the guide path 22 is in a form of a curve having a radius of curvature on the opposite side to the curling direction of the tape piece 4a. Namely, the guide path 22 is curved in the direction (downward as viewed in FIG. 1) in which the cutting blade 50 moves when the tape piece 4a is cut. In other words, the tape piece 4a is inserted into the guide path 22 in a state wherein the front surface, with printed letters, of the tape piece 4a is directed upward. This configuration can prevent the tape piece 4a from being separated upward from the guide path 22 due to the curl thereof. Further, the tape piece 4a can be kept in close contact with and guided along the guide path 22. Also it is possible to accurately cut off the tape piece 4a with the cutting blade 50, curing the curl of the tape piece 4a simultaneously.

Furthermore, the main body 30a is provided with a flexible connecting section 38 which can elastically change its shape, and extends toward the stop face 24 in approximately parallel with the tape piece 4a, and a hollow cover section 40 is arranged at the tip of the flexible section 38. Also, two presser feet 42 and 44 extrude diagonally downward from the cover section 40 to the tape piece 4a, and are bent to press the end 6 of the tape piece 4a to the guide path 22.

A portion of the cover section 40 is cut out to form a holder section 46 hanging down to the guide path 22 inside the cover section 40. In this holder section 46 is arranged a pin 48 extruding in parallel with the guide path 22. The pin 48 is inserted into an engagement hole 52 of the cutting blade 50. The diameter of the pin 48 is smaller by a specified length than a diameter of the engagement hole 52. Therefore, the cutting blade 50 can move or swing freely about the pin 48, that is, back and forth and in the left and light directions as shown by two arrows A and E in FIG. 5, so that the cutting blade 50 can hit the tape surface uniformly and stably. Note that a rib 51 extruding to the cutting blade 50 is formed inside the cover section 40 so that the cutting blade 50 is not disengaged from the engagement hole 52.

In FIG. 1, on the basic section 21 is mounted an operational lever 64, in a rotating manner about a pivot pin P, which is pulled by a pulling spring 66 to the inside of the basic section 21 to be stored therein. The operational lever 64 has a distal end 64a located over the holder section 46. The cutting blade 50 can be moved to the tape piece 4a by swinging the lever 64 in the direction indicated by an arrow B against the pulling force of the pulling spring 66 to push down the holder section 46 of the cutter holder 30 through the distal end 64a to accomplish elastic deformation of the flexible connecting section 38.

Description will now be made for operations of the tape end processing unit according to this embodiment.

First, the tape piece 4a as shown in FIG. 4 is prepared by the tape preparing unit 90. When the user inserts the tape piece 4a into the guide path 22 to process or cut the end 6 thereof, the tape piece 4a is guided by the tape guide 36 while raising the presser feet 42 and 44, and the front end of the tape piece 4a hits the stop face 24. Then, the lever 64 is swung in the direction indicated by the arrow B against the pulling force of the pulling spring 66 to push down the holder section 46 of the cutter holder 30 to move the cutting blade 50 to the tape piece 4a, thus the tape piece 4a being cut off. At this time, the presser feet 42 and 44 press the tape piece 4a toward the guide path 22 to prevent the tape piece 4a from going off therefrom.

Herein, as the guide path 22 has a form which can cure the curl of the tape piece 4a, the tape piece 4a can be kept in close contact with and guided along the guide path 22. For this reason, when the tape is cut, the tape piece 4a can accurately be cut off at a preset cutting position and at a correct cutting angle. Note that the guide path 22 for curing the curl of the tape piece 4a can also prevent the tape piece 4a from being raised and deviated from the guide path 22.

Then, description will be made for other embodiments.

Figure 6:
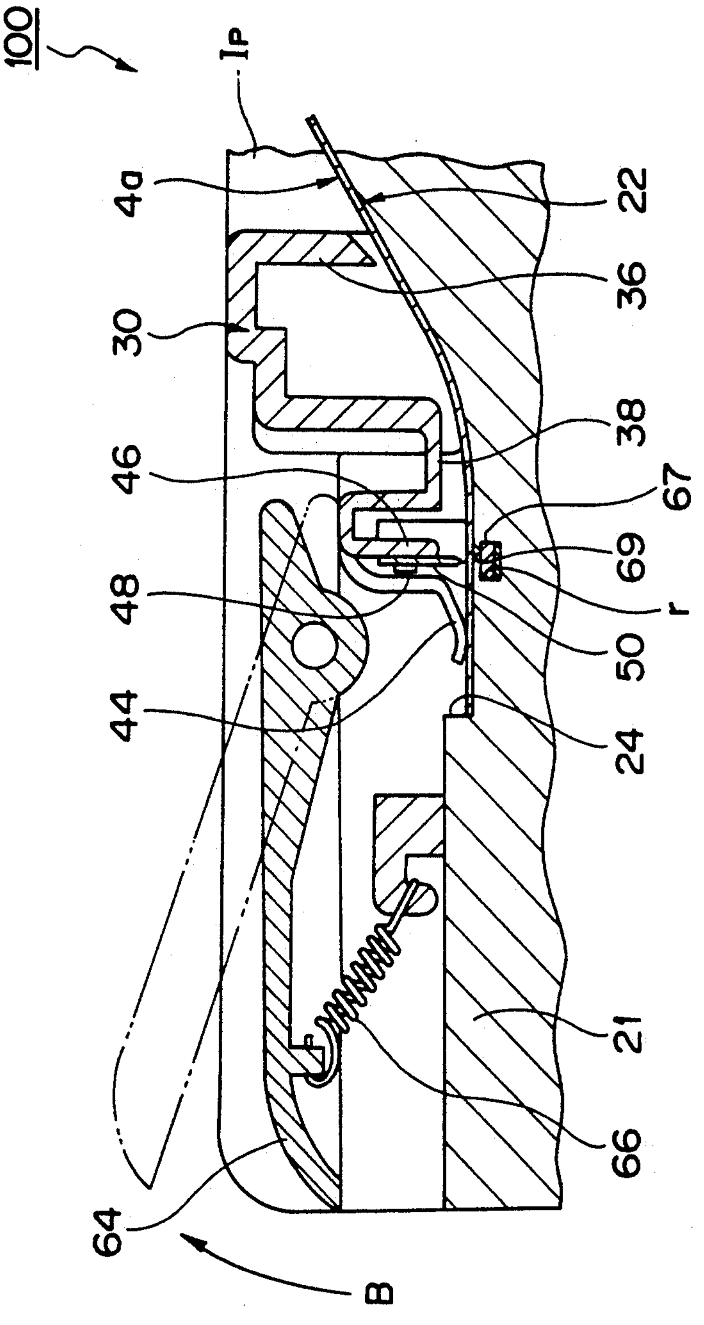
FIG. 6 is an illustration showing another embodiment of the tape end processing unit according to this invention.

FIG. 6 shows the general configuration of a tape end processing unit 100 which is another embodiment of this invention. The tape end processing unit 100 shown in FIG. 6 has the cutting blade 50 located along the width direction of the tape piece 4a prepared by the tape preparing unit 90 which uses the tape 4 comprising a releasable paper and a base tape laminated with an adhesive layer placed therebetween. The unit 100 further has a blade receiving stand 67 disposed in a recess r formed on the basic section 21 so as to be opposed to the cutting blade 50, and an operational member which moves the cutting blade 50 to the blade receiving stand 67 and cuts off an end of the tape piece 4a inserted between the cutting blade 50 and the blade receiving stand 67 in a state wherein a base tape faces the cutting blade 50. The blade receiving stand 67 is provided with a concave section 69 having a width narrower than the length of the cutting blade 50 and a depth smaller than the thickness of the releasable paper.

Figure 7:
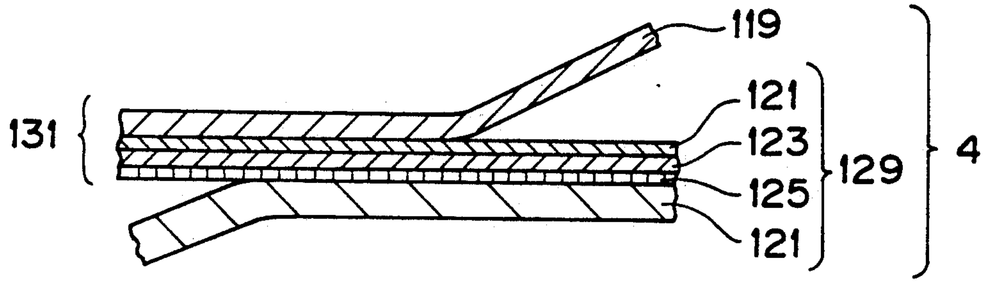
FIG. 7 is a cross-sectional view showing an example of a tape formed in the tape preparing unit.

Herein, the tape 4 has a configuration as shown in FIG. 7. Namely, the tape 4 is formed by adhering together a 50 μm polyethylene terephtalate (called PET hereinafter) on which printing is made to a double-face tape 129 comprising a transparent adhesive layer 121, a 12 μm PET film 123, a white adhesive layer 125 and a 67 μm releasable paper 127. The tape has a total thickness of 127 μm. A base tape 131 used for showing, for instance, a title on a file or others, comprises the PET film 119, the transparent adhesive layer 121, the PET film 123 and the white adhesive layer 125. Note that the PET film 119 and the double-face tape 129 are stored separately inside the preparing unit 90.

Figure 8:
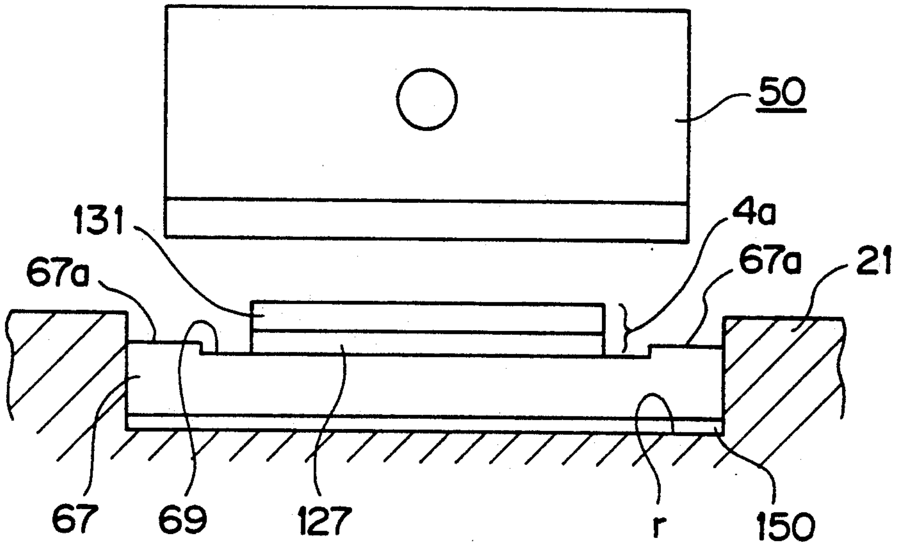
FIG. 8 is a cross-sectional view of a blade receiving stand in the tape end processing unit shown in FIG. 6.

As shown in FIGS. 6 and 8, in the recess r of the basic section 21 of the guide path 22 facing the cutting blade 50 is buried the blade receiving stand 67 made of stainless steel which is fixed thereto by an adhesive layer 150, and the tape piece 4a is cut off between the cutting blade 50 and the blade receiving stand 67. On a surface of the blade receiving stand 67 opposed to the cutting blade 50 is formed a concave section 69 having a width slightly wider than the width of the tape piece 4a and a depth of 50 μm that is slightly smaller than the thickness of the releasable paper 127. This concave section 69 is formed by means of pressing with a press or etching.

Figure 9:
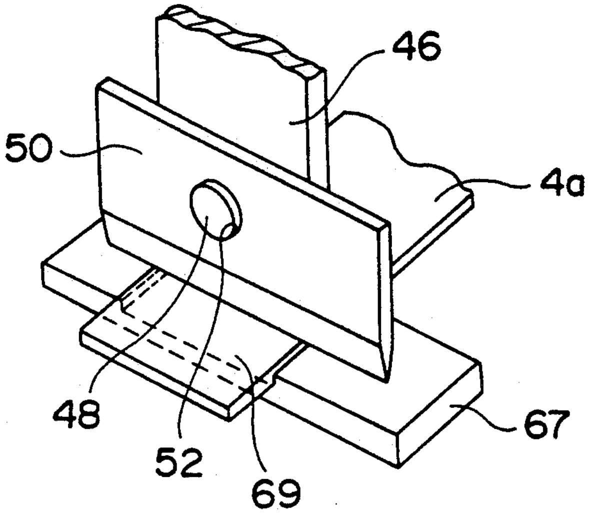
FIG. 9 is an illustration showing a cutting blade in the tape end processing unit according to this invention.

The cutting blade 50 is located, as shown in FIG. 9, along the width direction of the tape piece 4a, and the full length of the cutting blade 50 is larger than the width of the concave section 69. This cutting blade 50 is a straight blade with a Vickers hardness of 800 made of carbon steel treated by heat, and the blade tip is polished.

On the basic section 21 is mounted the operational lever 64 in a rotating manner, which is pulled by the pulling spring 66 toward the inside of the basic system to be stored therein. When this lever 64 is swung in the direction indicated by the arrow B against the pulling force of the pulling spring 66, the holder section 46 of the cutter holder 30 is pushed down and, the flexible connecting section 38 is elastically deformed to move the cutting blade 50 toward the blade receiving stand 67, thus the tape piece 4a being pressed thereto. Note that the operational member comprises the holder section 46 of the cutter holder 30, the lever 64 and the pulling spring 66.

Then, description will be made for operations of the tape end processing unit 100 according to this embodiment.

First, the tape piece 4a as shown in FIG. 4 is prepared by the tape preparing unit 90. When the user inserts the tape piece 4a into the guide path 22 to process the end 6 of the tape piece 4a, this tape piece 4a is guided by the tape guide 36 in a manner that the front end thereof hits the stop face 24. The end 6 of the inserted tape piece 4a is held in a gap between the cutting blade 50 and the blade receiving stand 67 by the presser feet 42 and 44 to prevent it from going off therefrom. Then, when the user swings the lever 64 in the direction indicated by the arrow B against the pulling force of the pulling spring 66, an end of the lever 64 pushes down the holder section 46 of the cutter holder 30 for the cutting blade 50 to be moved toward the tape piece 4a. Furthermore, when the lever 64 is swung in the direction indicated by the arrow B against the pulling force of the pulling spring 66, the cutting blade 50 is moved to the blade receiving stand 67 to hit the upper face thereof. Then, a portion of the releasable paper 127 is in the concave section 69 of the blade receiving stand 67, so that the releasable paper 127 is not cut off completely, but the base tape 131 is completely cut off because it is located at a higher position than the concave section 69.

When the releasable paper 127 is separated from the tape piece 4a whose end has been processed or cut as described above, if the tape piece 4a is bent with the end 6 thereof held by hand, a cut end of the base tape 131 rises from the releasable paper 127 because the base tape 131 has a resistance force against a bending force. For this reason, the user can quite easily separate the releasable paper 127 from the base tape 131 and adhere the base tape 131 at a desired place. Then, an end of the base tape never be bent.

In this embodiment, the thickness of the releasable paper 127 is 67 μm while the depth of the concave section 69 is set at 50 μm. The depth of the concave section 69 is preferably 25 to 75% of the thickness of the releasable paper 127, because, if the depth of the concave section 69 is larger than 75% of the thickness of the releasable paper 127, a bottom part of the base tape 131 goes into the concave section 69 and the base tape 131 is not sometimes to cut off completely. Also, if the depth of the concave section 69 is less than 25% of the thickness of the releasable paper 127, sometimes the releasable paper 127 is completely cut off.

As described above, the tape end processing unit 100 according to this embodiment has the concave section 69 having the depth more shallow than the thickness of the releasable paper 127 and arranged on the blade receiving stand 67, so that the unit 100 can cut off only the base tape 131 completely. Also, the cutting blade 50 and the blade receiving stand 67 contact each other at a place where the tape piece 4a is not cut off, that is, the opposite ends of the cutting blade 50 contact the left and right side ends 67a and 67a of the stand 67, so that the sharpness of the cutting blade 50 is not degraded even if it is used for a long time.

Furthermore, as shown in FIG. 6, if the guide path 22 is built in a convex form in the direction in which the cutting blade 50 moves when the tape piece 4a is cut, namely in a form curving in the reverse direction to that of the curl of the tape piece 4a when inserted into the guide path 22, it is possible to accurately cut off the tape piece 4a, curing the curl of the tape piece 4a simultaneously.

This invention is not limited to the embodiment described above, and various types of deformations may be made so far as the principles of this invention are kept.

Figure 10:
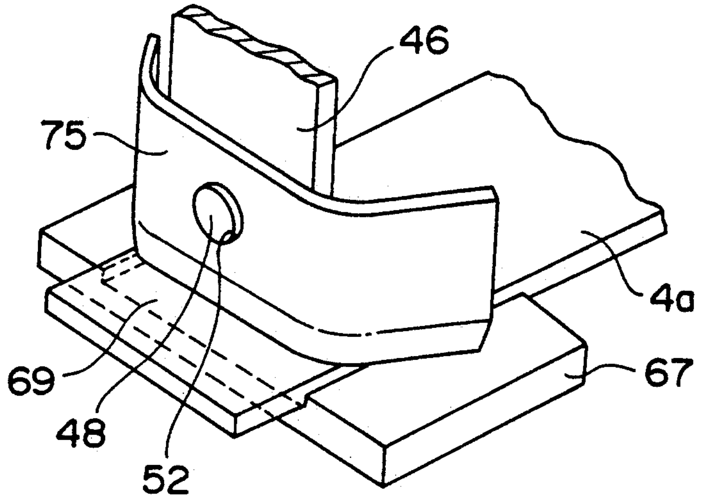
FIG. 10 is an illustration showing another embodiment of the cutting blade.

For instance, although the cutting blade used in this embodiment is straight, a differently shaped blade 75 having, for instance, a curved form as shown in FIG. 10 may be used. Also in this differently shaped blade 75, as in case of the cutting blade 50 having a straight form, only the base tape 131 can completely be cut off as in the embodiment mentioned above by arranging the concave section 69 having a width narrower than the length of the differently shaped blade 75 and a depth smaller than the thickness of the releasable paper 127. The base tape 131, an end of which is processed by the cutting blade having a straight form, is apt to easily be separated, at corners of the both ends, from a portion on which the base tape 131 is adhered. However, the base tape 131 with the end processed by this differently shaped blade 75 has no sharp corner at both ends, and is hard to be separated. Also, irrespective of whether the cutting blade 50 is straight or curved, as the width of the concave section 69 is smaller than the length of the cutting blade 50, both ends of the cutting blade 50 can be received by the opposite ends 67*a* and 67*a* of the blade receiving stand 67 without fail. For this reason, the releasable paper 127 of the tape piece 4*a* is not cut off completely. Especially, even if the cutting blade 50 hits the blade receiving stand 67 in an inclined position, the releasable paper 127 in the concave section 69 is not cut off completely.

Also, the width of the concave section 69 may be narrower than the width of the tape piece 4*a*. In this case, although a part of the releasable paper 127 is cut off, the entirety of the releasable paper 127 is not cut off completely, while the base tape 131 is completely cut off, so that the same effect as that in this embodiment is obtained.

The tape end processing unit 100 shown in FIG. 6 may be built in a form suitable for a housing of the tape forming device 1 as in case of the tape end processing unit 20 shown in FIG. 1.

What is claimed is:

1. A tape end processing unit for cutting an end of a tape piece on which an image is printed, which comprises:
- an insertion port into which the tape piece is inserted;
- a cutting blade for cutting off the end of the tape piece;
- a tape side facing in a direction in which said blade moves to cut said tape, said tape side forming a convex surface;
- an operational means for operating said cutting blade; and
- a guide path for guiding insertion of the tape piece from said insertion port to said cutting blade,
- said guide path being curved to receive said tape side convex surface and terminating at a stop face against which a front end of the tape piece hits to locate the tape piece in a cutting position.

2. A tape end processing unit of claim 1, wherein said unit is arranged integrally on a housing of a tape forming device which has a tape preparing means for printing letters or marks on a continuous tape to be cut at a predetermined length.

3. A tape end processing unit of claim 1, wherein said operational means comprises a swingable operational lever and a holder section of a cutter holder for holding said cutting blade, said holder section being connected to a main body of said cutter holder through a flexible connecting portion, and being moved in accordance with a swingable motion of said operational lever.

4. A tape end processing unit of claim 3, wherein said cutter holder is provided with a tape guide section disposed close to an insertion port into which a tape piece is inserted for guiding the tape piece toward the cutting blade and at least one presser foot which is disposed close to a stop face against which a front end of the tape piece hits to locate the tape piece in a cutting position in order to press the tape piece onto a guide path for guiding insertion of the tape piece.

5. A tape end processing unit for cutting an end of a tape piece prepared by a tape preparing means for printing an image on a continuous tape which comprises a releasable tape and a base tape laminated with an adhesive layer placed therebetween and which is cut at a predetermined length, which comprises:
- an insertion port into which the tape piece is inserted;
- a cutting blade for cutting off the end of the tape piece;
- an operational means for operating said cutting blade;
- a guide path for guiding insertion of the tape piece from an insertion port to a position for cutting the tape piece by the cutting blade; and
- a blade receiving stand facing the cutting blade for receiving the cutting blade when the tape piece is cut,
- said blade receiving stand being provided with a concave section which has a width narrower than a length of said cutting blade and a depth smaller than a thickness of the releasable paper and is arranged on a face, opposed to the cutting blade, of said blade receiving stand.

6. A tape end processing unit of claim 5, wherein the said blade receiving stand is made of stainless steel.

7. A tape end processing unit of claim 5, wherein said unit is arranged integrally on a housing of a tape forming device which has said tape preparing means therein.

8. A tape end processing unit of claim 5, wherein said guide path terminates at a stop face against which a front end of the tape piece hits to locate the tape piece in a cutting position.

9. A tape end processing unit of claim 5, wherein said operational means comprises a swingable operational lever and a holder section of a cutter holder for holding said cutting blade, said holder section being connected to a main body of said cutter holder through a flexible connecting portion, and being moved in accordance with a swingable motion of said operational lever.

10. A tape end processing unit of claim 9, wherein said cutter holder is provided with a tape guide section disposed close to an insertion port into which a tape piece is inserted for guiding the tape piece toward the cutting blade and at least one presser foot which is disposed a stop face against which a front end of the tape piece hits to locate the tape piece in a cutting position in order to press the tape piece onto a guide path for guiding insertion of the tape piece.

11. A tape end processing unit for cutting an end of a tape piece prepared by a tape preparing means for printing an image on a continuous tape which comprises a releasable tape and a base tape laminated with an adhesive layer placed therebetween and which is cut at a predetermined length, which comprises:
- an insertion port into which the tape piece is inserted;
- a cutting blade for cutting off the end of the tape piece;
- a blade receiving stand disposed a distance away from said cutting blade for receiving said cutting blade when the tape piece is cut;
- an operational means for moving said cutting blade toward said blade receiving stand to cut off an end of the tape piece inserted between said cutting blade and said blade receiving stand in a state wherein the base tape faces said cutting blade;

a tape side facing in a direction in which said blade moves to cut said tape, said tape side forming a convex surface; and a guide path for guiding insertion of the tape piece from said insertion port to said cutting blade, said guide path being curved to receive said tape side forming a convex surface;

said blade receiving stand being provided with a concave section which has a width narrower than a length of said cutting blade and a depth smaller than a thickness of said releasable tape said concave section being arranged on a face of said blade receiving stand opposed to said cutting blade.

12. A tape end processing unit of claim 11, wherein said blade receiving stand is made of stainless steel.

13. A tape end processing unit of claim 11, wherein said unit is arranged integrally on a housing of a tape forming device which has the tape preparing means therein.

14. A tape end processing unit of claim 11, wherein said guide path terminates at a stop face against which a front end of the tape piece hits to locate the tape piece in a cutting position.

15. A tape end processing unit of claim 11, wherein said operational means comprises a swingable operational lever and a holder section of a cutter holder for holding said cutting blade, said holder section being connected to a main body of said cutter holder through a flexible connecting portion, and being moved in accordance with a swingable motion of said operational lever.

16. A tape end processing unit of claim 11, wherein said cutter holder is provided with a tape guide section disposed close to an insertion port into which a tape piece is inserted for guiding the tape piece toward the cutting blade and at least one presser foot which is disposed close to a stop face against which a front end of the tape piece hits to locate the tape piece in a cutting position in order to press the tape piece onto a guide path for guiding insertion of the tape piece.

17. A tape end processing unit of claim 11, wherein said tape preparing means comprises a printing means for printing said image on said base tape laminated with said releasable tape by said adhesive layer placed therebetween and a storing means for storing said base tape in its wound state.

18. A tape end processing unit of claim 17, wherein said tape preparing means further comprises a releasable tape storing means for storing said releasable tape of which one of faces has the adhesive layer and a guide means for superposing said releasable tape onto said base tape.

19. A tape end process unit of claim 18, wherein said guide means includes a means for laminating a surface on which the image has been printed by said printing means for said base tape with said releasable tape by placing the adhesive layer therebetween.

* * * * *